United States Patent
Jreij et al.

(10) Patent No.: US 12,450,333 B2
(45) Date of Patent: Oct. 21, 2025

(54) SECURE MANAGEMENT CONTROLLER ENHANCEMENT WITH CONTAINERIZED APPLICATIONS

(71) Applicant: Dell Products L.P., Round Rock, TX (US)

(72) Inventors: Elie Antoun Jreij, Pflugerville, TX (US); Marshal F. Savage, Austin, TX (US); Prashanth Giri, Round Rock, TX (US); Jack Elmer Fewx, Austin, TX (US); Jitendra Gul Jagasia, Round Rock, TX (US); Ching-Jye Chang, Cedar Park, TX (US); Michael Brown, Austin, TX (US); Michael Daniele, Hudsun, NH (US)

(73) Assignee: Dell Products L.P., Round Rock, TX (US)

( * ) Notice: Subject to any disclaimer, the term of this patent is extended or adjusted under 35 U.S.C. 154(b) by 117 days.

(21) Appl. No.: 18/365,059

(22) Filed: Aug. 3, 2023

(65) Prior Publication Data
US 2025/0045377 A1 Feb. 6, 2025

(51) Int. Cl.
*G06F 21/53* (2013.01)
*G06F 21/57* (2013.01)

(52) U.S. Cl.
CPC ............ *G06F 21/53* (2013.01); *G06F 21/572* (2013.01)

(58) Field of Classification Search
CPC .............................. G06F 21/53; G06F 21/572
See application file for complete search history.

(56) References Cited

U.S. PATENT DOCUMENTS

| | | | | |
|---|---|---|---|---|
| 2012/0166041 | A1* | 6/2012 | Takehisa | B60H 1/00742 |
| | | | | 701/36 |
| 2013/0290729 | A1* | 10/2013 | Pettigrew | G06F 21/51 |
| | | | | 713/189 |
| 2014/0075197 | A1* | 3/2014 | Alrabady | G06F 21/57 |
| | | | | 713/176 |
| 2019/0075113 | A1* | 3/2019 | Teshler | H04W 12/10 |
| 2019/0190703 | A1* | 6/2019 | Lekkas | H04L 9/0825 |
| 2021/0398364 | A1* | 12/2021 | Tschache | G06F 8/71 |
| 2022/0046080 | A1* | 2/2022 | Ka | G06F 9/45508 |
| 2022/0201083 | A1* | 6/2022 | Kathpal | H04W 4/44 |

FOREIGN PATENT DOCUMENTS

DE 102021208865 A1 * 2/2022 ............. G06F 21/32

* cited by examiner

*Primary Examiner* — Trong H Nguyen
(74) *Attorney, Agent, or Firm* — Jackson Walker L.L.P.

(57) ABSTRACT

An information handling system may include a host system; and a management controller comprising at least one management controller processor and a management controller storage resource. The management controller may be configured to: install a firmware image onto the management controller storage resource; subsequent to installing the firmware image, receive a plugin application; cryptographically verify a source of the plugin application; install the plugin application onto the management controller storage resource; and execute the plugin application.

14 Claims, 3 Drawing Sheets

SECURE MANAGEMENT CONTROLLER ENHANCEMENT WITH CONTAINERIZED APPLICATIONS

TECHNICAL FIELD

The present disclosure relates in general to information handling systems, and more particularly to techniques for securely enhancing the functionality of management controllers of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems include a management controller for providing out-of-band management. In various embodiments, management controllers may perform low-level tasks such as measuring temperature probes and managing fan speeds, to more medium level-tasks such as providing a way to change BIOS settings, up through higher-level functions such as acting as "virtual media" for the system to allow for installing an operating system, etc.

Historically, management controller firmware has been implemented as a monolithic firmware image that is developed by the manufacturer, cryptographically signed, and loaded onto the management controller. For purposes of this onto the disclosure, the term "monolithic" refers to a firmware image distributed as a single, self-contained binary wherein the customer has no mechanism to add or remove code that will run on the management controller. That is, there is no existing way to dynamically extend the features of a management controller in the field or at runtime. The monolithic firmware image may even be identical for all information handling systems from a given manufacturer and contain all of the released functionality for that manufacturer's management controllers.

In addition, in the modern area, advanced security threats are often targeted at management controllers, because an exploit in a management controller can lead to persistent malicious to the information handling system it manages. Accordingly, there are many features of management controllers implemented to prevent execution of external code, such as the hardware root of trust as well as software security features such as SELinux.

There are several problems with the existing monolithic delivery approach. First, a user may add hardware to the information handling system which is not recognized by the management controller. Modern systems and modern add-on card hardware often use a significant amount of power and require precise thermal management, and so when an unknown card is present in the system, the management controller generally uses conservative cooling levels (e.g., using an open-loop control algorithm). This conservative approach often uses more power to drive fans and more cooling than may technically be required; conversely, a card may need even more cooling (e.g., targeted cooling) than is provided in this way, and it may run into thermal throttling limits. Therefore, it would be advantageous to be able to run code that more cleanly integrates unsupported add-in card thermal management into the core power and cooling algorithms. For purposes of this disclosure, the term "unsupported" refers to an information handling resource that has not been verified by the manufacturer of an information handling system to work correctly in the information handling system.

Additionally, because different cards have different ways to read thermal probes, it is not always possible to write a generic implementation, and so the management controller often needs custom code to support this feature. It would thus be advantageous to have the ability to run arbitrary unsupported cards with tight integration into the core power and thermal algorithms of the management controller, because doing so would cost customers less money in power and cooling costs while enabling add-in cards to run at their maximum potential.

There are also other problems that may be addressed by using a general mechanism to add new code to a management controller at runtime. For example, such a management controller could run a cloud integration plugin that integrates with a cloud management controller without the need to set up on-premise console applications. Or such a management controller could run an AI/ML-based anomaly detection plugin that observes local telemetry and predicts memory, hard drive, or other failures, while at the same time being updatable to include the latest trained models in real-time.

Accordingly, embodiments of this disclosure may allow for the installation of new software features in a management controller at runtime without having to update the entire management controller firmware image. An architecture is provided that allows comprehensive security from end to end in a way that guarantees that the hardware root of trust is maintained.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with management controllers of information handling systems may be reduced or eliminated.

In accordance with embodiments of the present disclosure, an information handling system may include a host system; and a management controller comprising at least one management controller processor and a management controller storage resource. The management controller may be configured to: install a firmware image onto the management controller storage resource; subsequent to installing the firmware image, receive a plugin application; cryptographically verify a source of the plugin application; install the plugin application onto the management controller storage resource; and execute the plugin application.

In accordance with these and other embodiments of the present disclosure, a method may include a management controller installing a firmware image onto a storage resource thereof; subsequent to installing the firmware image, the management controller receiving a plugin application; the management controller cryptographically verifying a source of the plugin application; the management controller installing the plugin application onto the storage resource; and the management controller executing the plugin application.

In accordance with these and other embodiments of the present disclosure, an article of manufacture may include a non-transitory, computer-readable medium having computer-executable instructions thereon that are executable by a processor of a management controller of an information handling system for: installing a firmware image onto a storage resource of the management controller; subsequent to installing the firmware image, receiving a plugin application; cryptographically verifying a source of the plugin application; installing the plugin application onto the storage resource; and executing the plugin application.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
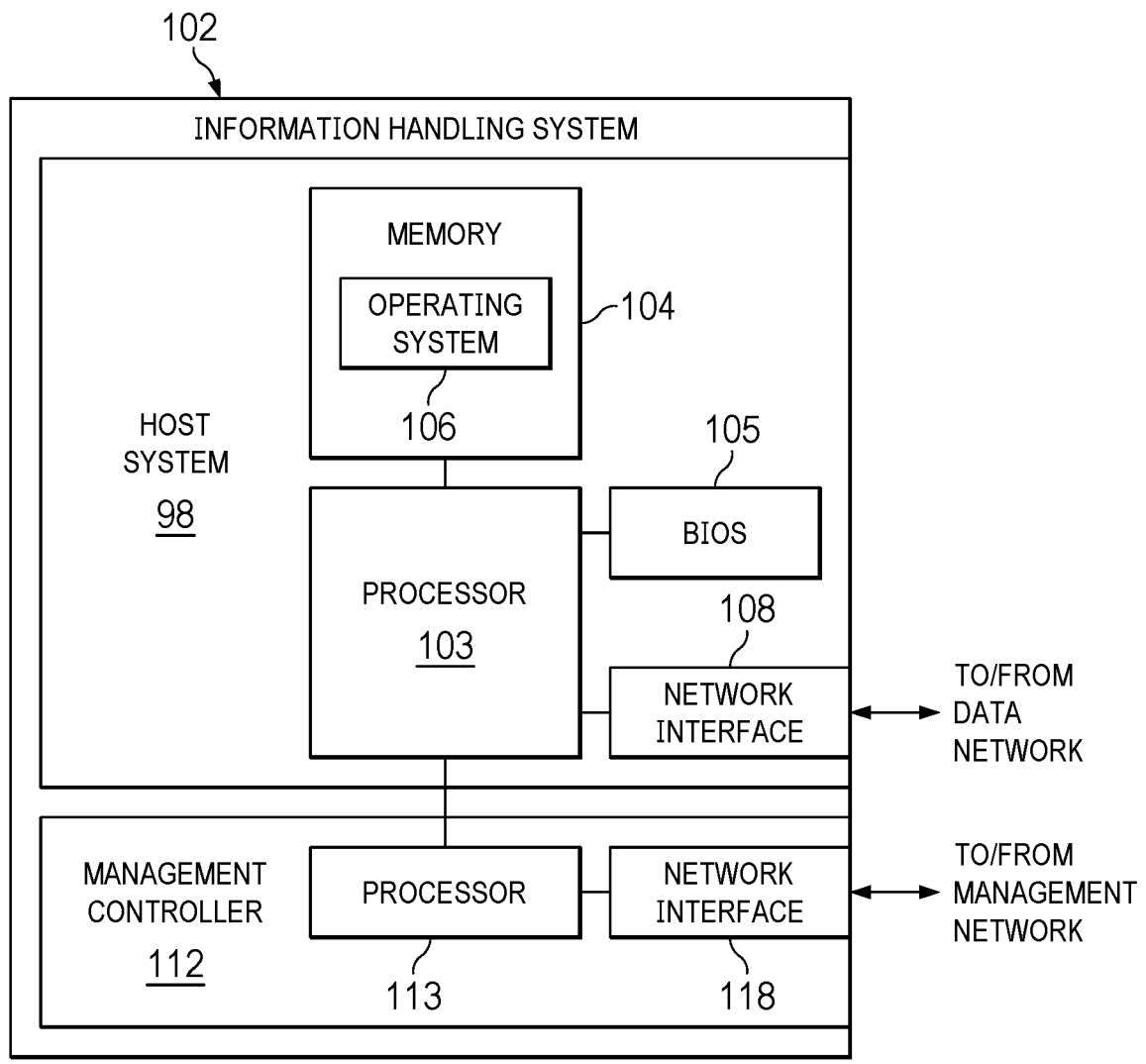
FIG. 1 illustrates a block diagram of an example information handling system, in accordance with embodiments of the present disclosure.
Figure 2:
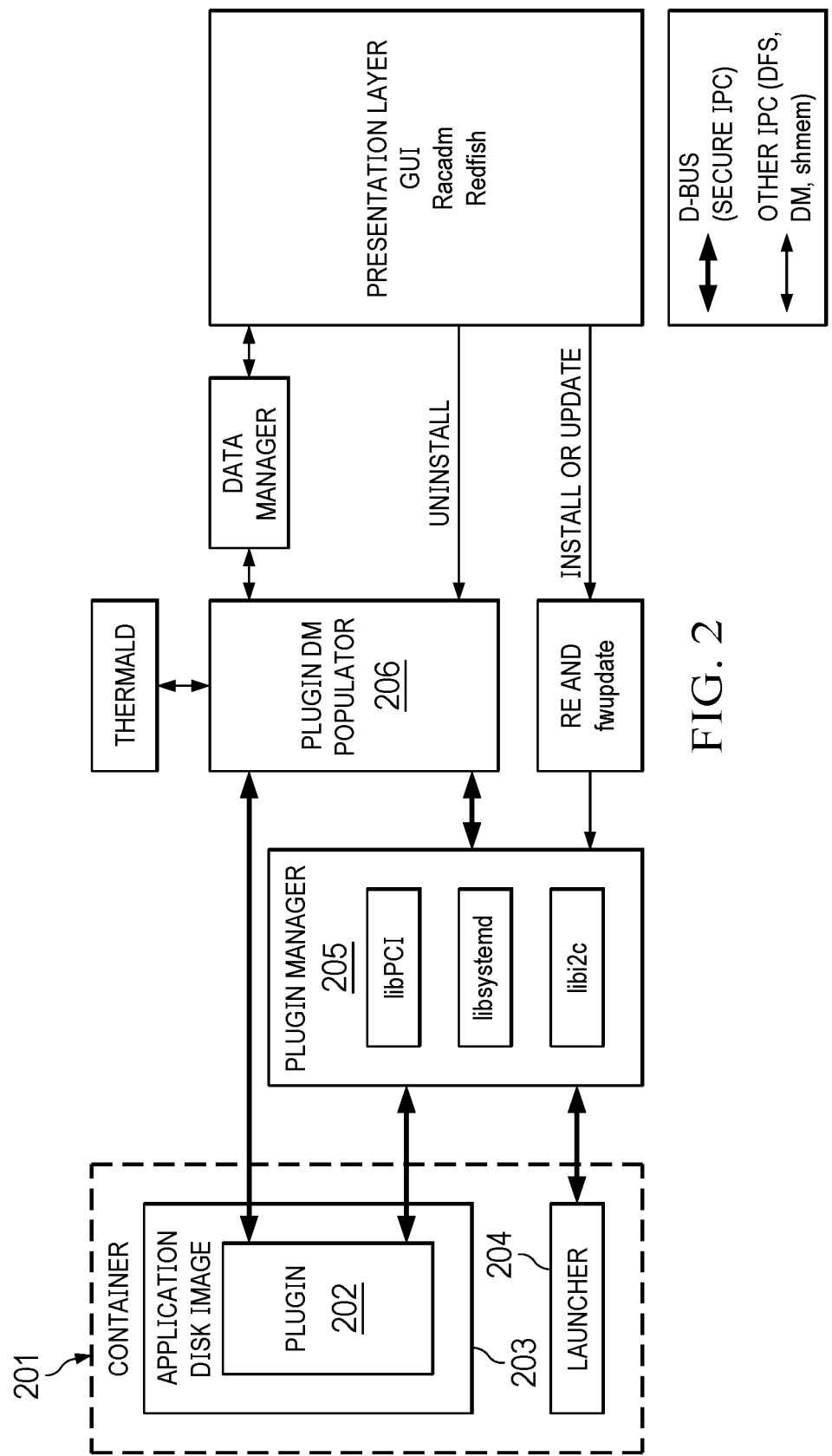
FIG. 2 illustrates an example plugin container architecture, in accordance with embodiments of the present disclosure.
Figure 3:
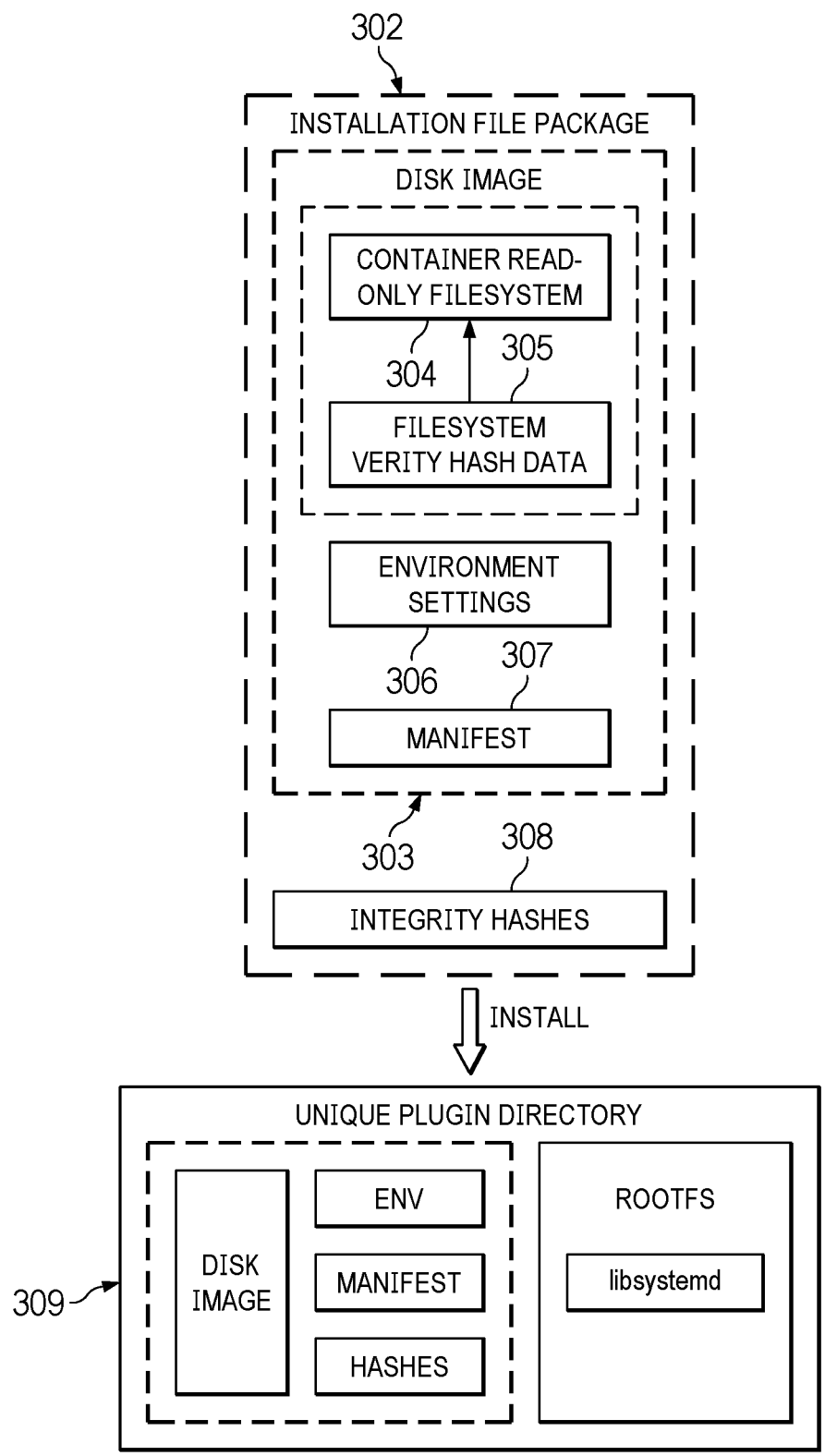
FIG. 3 illustrates a block diagram of the file structure of a plugin before and after installation, in accordance with embodiments of the present disclosure.

Preferred embodiments and their advantages are best understood by reference to FIGS. 1-3, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, embodiments of this disclosure provide improvements in the ability to deploy new features to management controller 112 without the need to re-flash its whole firmware. In particular, the functionality of management controller 112 may be extended by installing plugins. For purposes of this disclosure, the term "plugin" refers to any executable code that can be installed and run on a management controller, but which is not included in the main firmware image.

The security considerations for operating such a plugin system are important. Various features may be leveraged as discussed herein to address such concerns, allowing the overall security of the management controller to be maintained even in the face of individual plugin components that may have security defects.

For example, according to one embodiment, plugins may be installed from a standardized installation file package (e.g., a "Dell Update Package" or DUP file) of the type used for distributing management controller firmware updates, BIOS updates, drivers, and other packages. Such an installation file package may have embedded digital signatures, and the management controller may prevent installation of unsigned content. Thus, the manufacturer may retain control over distribution of all plugins, and no third party can create installable plugins without going through the manufacturer's auditing and security analysis.

Further, embodiments may implement installation-time and launch-time verification of the plugin. After installation, the plugin may be contained on the management controller's storage resource in a single "application disk image" file that includes all the content the plugin requires, including binaries, libraries, and any other static content needed. The installation process may provide a cryptographic hash for the application disk image file. Before each run of the plugin, the integrity of the image and if any anomaly or corruption is may be checked, detected, the plugin may be disabled and/or removed. Additionally, during runtime, if the kernel needs to read data for the plugin, it can cryptographically verify the data in the plugin as it reads it, ensuring the root of trust is unbroken.

By leveraging the existing installation file packaging infrastructure and performing integrity checks of the installed plugin, embodiments may securely extend management controller functionality in a way that integrates into the existing hardware root of trust. Thus as in existing systems, the manufacturer may sign a management controller firmware image, and a customer can trust that the code running on the management controller is authentic. With the addition of the plugins, this guarantee of authenticity can also extend to code installed after the fact, outside of the main management controller firmware image.

Embodiments may also implement runtime sandboxing, so that the plugin is launched in a tightly confined and isolated sandbox. The plugin may be denied access to any file, interface, or socket on the management controller unless explicitly granted access by policy. The standard allowed interface may be implemented as a single D-Bus connection to a plugin manager application, which may be built into the main firmware image. Additional interfaces may be opened in the sandbox for highly trusted plugins (e.g., those developed by the manufacturer directly). This feature is discussed below in more detail with regard to FIG. 2.

Embodiments may further implement runtime file verity checking. As mentioned above, the plugin may be self-contained in a single application disk image file. That file may be constantly monitored during runtime for any changes to its contents at a bit level. Every block of the file may also be monitored by the kernel while resident in RAM to check for corruption or modification, and the plugin may be shut down immediately if any changes are detected. Before relaunching the plugin, the installation-time and launch-time verification of the application disk image file may be performed again as discussed above.

With this runtime verity checking, embodiments may eliminate a vulnerability that is present in some systems in which integrity checking is done only at system boot, and so if an attacker modifies the running system, those changes are not detected until the system is restarted. With this runtime verity checking, the attacker has no way to modify a system either before boot or on a running system without being detected. This feature is discussed below in more detail with regard to FIG. 3.

Turning now to FIG. 2, a block diagram is shown illustrating a plugin container architecture, according to some embodiments.

Container 201 implements the sandboxing features discussed above, and it may contain plugin 202 (the actual third-party app which runs inside the isolated container) within application disk image 203.

Application disk image 203 may be implemented as a private root filesystem containing all the necessary files for operation of plugin 202, including a manifest (which specifies what features are required by a plugin). The details of application disk image 203 are discussed in more detail below with regard to FIG. 3.

Launcher 204 may be configured to execute plugin 202 (e.g., by using system-nspawn to run a plugin deployed in squashfs format).

Plugin manager 205 manages all of the installed plugins and provides their D-Bus interfaces to communicate with the remainder of the system. Plugins may be installed, uninstalled, started, stopped, and monitored by plugin manager 205.

Plugin data manager (DM) populator 206 is configured to convert D-Bus data from plugin manager 205 into the DM objects required by various management controller interfaces for hardware and software inventory and troubleshooting of plugins. In particular, plugin DM populator 206 may provide plugin 202 with access to a restricted subset of the inter-process communication (IPC) bus. This allows plugin 202 to interact with other processes, for example to implement thermal management of unsupported PCIe cards. Plugin 202 may read temperature information, communicate with the existing thermal management daemon thermald, etc. via plugin DM populator 206.

As shown, container 201 can access only plugin manager 205 and plugin DM populator 206. Access to any other component must flow through one of those two D-Bus paths, which ensures that the container does not have unauthorized access to any of the host's files, network sockets, etc.

The presentation layer provides various user interfaces to allow the user to manage plugins 202 and the related infrastructure.

Turning now to FIG. 3, a block diagram is shown illustrating the file structure of a plugin before and after installation, according to some embodiments.

As shown, a plugin may be deployed in a standard installation file package 302, which may be signed and verified via integrity hashes 308 using the existing hardware root of trust.

Within the installation file package 302, disk image 303 may be provided as a standard discoverable Linux GPT disk image in some embodiments.

Container read-only filesystem 304 may be provided as a read-only squashfs filesystem in some embodiments, and it may contain the plugin executables and other components. Filesystem verity hash data 305 may provide verity signature data for container read-only filesystem 304, usable for pre-start and runtime integrity checks.

Environment settings 306 may be a file that contains plugin startup information. Manifest 307 may be implemented as JSON file, including the complete runtime a configuration, permissions, and user-visible details about the plugin (e.g., vendor name, version, dependencies, etc.).

Integrity hashes 308 may include SHA512 integrity hashes of components 303, 305, 306, and 307 in some embodiments.

As shown, components 303-308 may be installed into a unique plugin directory 309 for that plugin, stored on a storage resource within (or accessible to) the management controller.

As one of ordinary skill in the art will appreciate, FIG. 3 provides only one possible implementation of the plugin file structure signature details. Other and implementations are possible within the scope of this disclosure.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
    a host system; and
    a management controller comprising at least one physical management controller processor and a physical management controller storage resource, wherein the management controller is configured to provide out-of-band management of the information handling system;
    wherein the management controller is configured to:
    install a firmware image onto the management controller storage resource;
    subsequent to the installing of the firmware image, receive a plugin application, wherein the plugin application is configured to perform thermal management of at least one unsupported card inserted in the information handling system;
    cryptographically verify a source of the plugin application;
    install the plugin application onto the management controller storage resource; and
    execute the plugin application.

2. The information handling system of claim 1, wherein the plugin application is configured to execute in a sandboxed environment that is configured to limit access to other processes executing at the management controller.

3. The information handling system of claim 1, wherein the management controller is configured to perform a first verification of the plugin application prior to executing the plugin application and a second verification of the plugin application during runtime of the plugin application.

4. The information handling system of claim 1, wherein the plugin application is a cloud integration plugin configured to integrate with a cloud-based management controller.

5. The information handling system of claim 1, wherein the plugin application is configured to implement at least one new software feature executable by the management controller.

6. A method comprising:
    installing, by a management controller, a firmware image onto a storage resource thereof, wherein the management controller is configured to provide out-of-band management of an information handling system;
    subsequent to the installing of the firmware image, receiving, by the management controller, a plugin application, wherein the plugin application is configured to perform thermal management of at least one unsupported card inserted in the information handling system;
    cryptographically verifying, by the management controller, a source of the plugin application;
    installing, by the management controller, the plugin application onto the storage resource; and
    executing, by the management controller, the plugin application.

7. The method of claim 6, wherein the plugin application is configured to execute in a sandboxed environment that is configured to limit access to other processes executing at the management controller.

8. The method of claim 6, further comprising performing, by the management controller, a first verification of the plugin application prior to executing the plugin application and a second verification of the plugin application during runtime of the plugin application.

9. The method of claim 6, wherein the installing of the plugin application does not include replacing the firmware image.

10. The method of claim 6, wherein the plugin application is a cloud integration plugin configured to integrate with a cloud-based management controller.

11. An article of manufacture comprising a non-transitory, computer-readable medium having computer-executable instructions thereon that are executable by a processor of a management controller of an information handling system for:
    installing a firmware image onto a storage resource of the management controller, wherein the management controller is configured to provide out-of-band management of the information handling system;
    subsequent to the installing of the firmware image, receiving a plugin application, wherein the plugin application is configured to perform thermal management of at least one unsupported card inserted in the information handling system;
    cryptographically verifying a source of the plugin application;
    installing the plugin application onto the storage resource; and
    executing the plugin application.

12. The article of claim 11, wherein the plugin application is configured to execute in a sandboxed environment that is configured to limit access to other processes executing at the management controller.

13. The article of claim 11, wherein the management controller is configured to perform a first verification of the plugin application prior to executing the plugin application and a second verification of the plugin application during runtime of the plugin application.

14. The article of claim 11, wherein the management controller comprises a baseboard management controller (BMC).

* * * * *